(12) United States Patent
Murphy et al.

(10) Patent No.: US 6,886,417 B2
(45) Date of Patent: May 3, 2005

(54) NON-UNIFORM RIGIDITY INTERFACE PANEL FOR A FLUID-FILLED SEAT BLADDER

(75) Inventors: Morgan D. Murphy, Kokomo, IN (US); Mark A. Ginter, Russiaville, IN (US); John T Waidner, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/665,095

(22) Filed: Sep. 17, 2003

(65) Prior Publication Data

US 2005/0056101 A1 Mar. 17, 2005

(51) Int. Cl.$^7$ .................................................. G01L 7/00
(52) U.S. Cl. .................................................. 73/862.581
(58) Field of Search .......................... 73/826, 862.581, 73/862.391, 862.474; 180/273; 280/735, 280/730.2; 5/653; 297/284.6; 177/144

(56) References Cited

U.S. PATENT DOCUMENTS

| | | | |
|---|---|---|---|
| 5,918,696 A * | 7/1999 | VanVoorhies | 180/273 |
| 5,984,349 A * | 11/1999 | Van Voorhies | 280/735 |
| 6,056,079 A * | 5/2000 | Cech et al. | 180/273 |
| 6,490,936 B1 * | 12/2002 | Fortune et al. | 73/862.581 |
| 6,571,647 B1 * | 6/2003 | Aoki et al. | 73/862.381 |
| 6,578,871 B2 * | 6/2003 | Gray et al. | 280/735 |

* cited by examiner

*Primary Examiner*—Edward Lefkowitz
*Assistant Examiner*—Octavia Davis
(74) *Attorney, Agent, or Firm*—Stefan V. Chmielewski

(57) ABSTRACT

A seat bladder weight estimation apparatus includes an interface panel having multiple regions of substantial rigidity separated by regions of insubstantial rigidity. The regions of substantial rigidity limit sensitivity to seat foam variations, and the regions of insubstantial rigidity permit differential movement and angulation of the rigid regions for regional transfer of occupant weight to the bladder. The regional transfer of occupant weight to the bladder allows regional variation of the bladder sensitivity to occupant weight through various bladder geometry design features.

8 Claims, 2 Drawing Sheets

US 6,886,417 B2

NON-UNIFORM RIGIDITY INTERFACE PANEL FOR A FLUID-FILLED SEAT BLADDER

TECHNICAL FIELD

The present invention is directed to a fluid-filled seat bladder for vehicle occupant weight estimation, and more particularly to an interface panel for a bladder assembly.

BACKGROUND OF THE INVENTION

Vehicle occupant detection systems are useful in connection with air bags and other pyrotechnically deployed restraints as a means of judging whether, and how forcefully, to deploy the restraint. For example, it is useful to know the seated weight of the occupant, and whether the detected weight is due to a normally seated child or adult, or a cinched booster seat or infant carrier. Additionally, the detection system must be capable of accurately providing the required occupant information throughout the expected life of the vehicle.

A popular and cost-effective way of providing the above-mentioned occupant data is to install a fluid-filled elastomeric bladder in or under the seat cushion, and to measure the fluid pressure in the bladder. See for example, the U.S. Pat. Nos. 5,987,370; 6,101,436; 6,246,936 and 6,490,936, assigned to the assignee of the present invention, and incorporated herein by reference. The measured pressure provides an indication of occupant weight, and the sensitivity of the bladder to occupant weight in different areas of the seat can be tailored to effectively distinguish between different types of occupants. For example, the bladder sensitivity can be minimized in areas of the seat normally engaged by an infant or booster seat so that the measured pressure for an infant or booster seat will be less than, say, a $5^{th}$ percentile adult female occupant. In other words, the bladder geometry can be designed to result in a weight separation between occupants for whom deployment should be enabled and occupants for whom deployment should be disabled or reduced in force. See, for example, the aforementioned U.S. Pat. No. 6,101,436, where bladder sensitivity is tailored by selectively welding the top and bottom layers of the bladder to form a pattern or array of flow-through cells or fluid-free pockets. However, the use of bladder geometry features for sensitivity tuning can be significantly restricted when a rigid interface panel or board is installed between the bladder and seat cushion. Interface panels are used to provide a controlled interface between the seat cushion and the bladder that limits the system sensitivity to seat foam variations caused by manufacturing irregularities, temperature and aging, and protects the bladder from puncture due to sharp objects coming into contact with the cushion. Interface panels can also be used between the bladder and the seat frame for similar reasons. See, for example, the aforementioned U.S. Pat. No. 6,490,936. In any event, such interface panels tend to evenly distribute the occupant weight over the bladder, masking the sensitivity variations that would otherwise occur due to bladder geometry features. Accordingly, what is needed is an interface panel for a seat bladder occupant weight estimation system that will protect the bladder and limit the system sensitivity to seat foam and suspension variations, without preventing the use of bladder geometry features for sensitivity control.

SUMMARY OF THE INVENTION

The present invention is directed to an improved seat bladder weight estimation apparatus including an interface panel having multiple regions of substantial rigidity separated by regions of insubstantial rigidity. The regions of substantial rigidity limit sensitivity to seat foam variations, and the regions of insubstantial rigidity permit differential movement and angulation of the rigid regions for regional transfer of occupant weight to the bladder. The regional transfer of occupant weight to the bladder allows regional variation of the bladder sensitivity to occupant weight through various bladder geometry design features. The interface panel may be comprised of rigid plates affixed to a flexible base sheet, or a single sheet of non-uniform thickness. Additionally, the interface panel may be produced as a separate item or integrated into the seat foam by insert molding.

BRIEF DESCRIPTION OF THE DRAWINGS

The present invention will now be described, by way of example, with reference to the accompanying drawings, in which:—

DESCRIPTION OF THE PREFERRED EMBODIMENT

Figure 1:
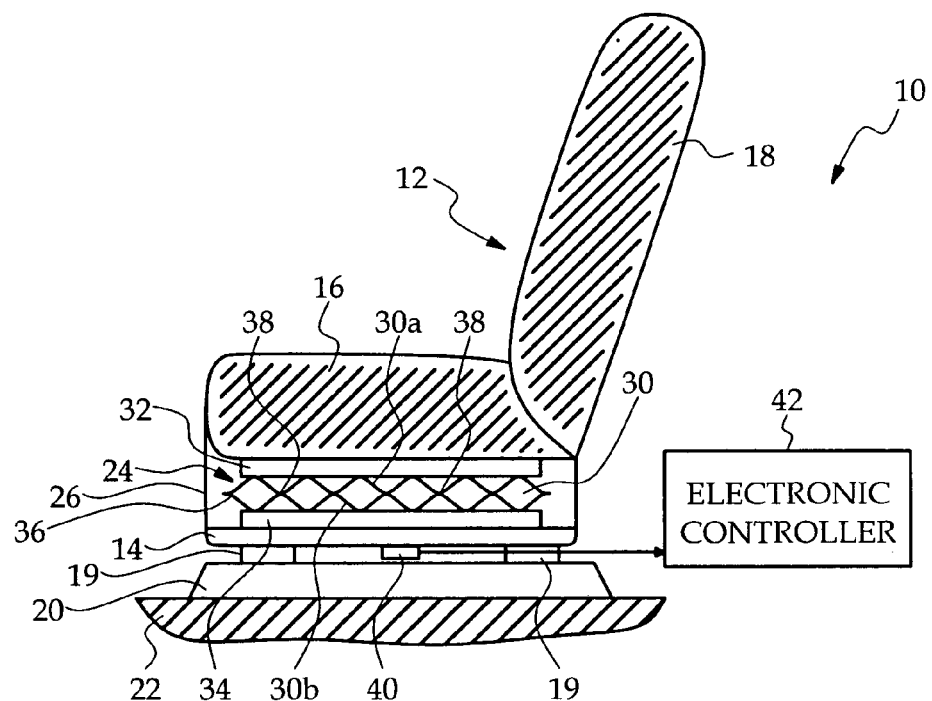
FIG. 1 is a system diagram including a fluid-filled seat bladder and upper and lower interface panels according to this invention.

Referring to the drawings, and particularly to FIG. 1, the reference numeral 10 generally designates a vehicle occupant weight estimation apparatus according to this invention. The vehicle seat, generally designated by the reference numeral 12, includes a rigid frame and spring suspension 14, a bottom foam cushion 16 and a back foam cushion 18. A set of posts 19 integral to the frame 14 attach the seat 12 to pair of tracks 20 (only one of which is shown in FIG. 1), which in turn, are secured to the vehicle floor 22. A bladder assembly 24 is sandwiched between the bottom cushion 16 and the suspension elements of frame 14 for the purpose of detecting the presence and weight of an occupant of seat 12, as explained below. Finally, a fabric cover 26 envelopes the cushion 16, bladder assembly 24 and frame 14.

The bladder assembly 24 comprises a fluid-filled elastomeric bladder 30, upper and lower interface panels 32 and 34, and a pressure sensor 40. The bladder 30 is formed of upper and lower sheets 30a, 30b that are peripherally welded as indicated by the reference numeral 36 to form a closed volume, and selectively welded within the peripheral weld 36 as indicated by the reference numerals 38 to form a plurality of flow-through cells. In general, the weight of a vehicle occupant seated on the cushion 16 is applied to the bladder 30, and an electronic controller 42 coupled to the pressure sensor 40 develops an estimation of the occupant weight based on the measured pressure and its variation with respect to time; see, for example, the aforementioned U.S. Pat. Nos. 5,987,370 and 6,246,936. Additionally, the cells formed by the inter-peripheral welds 38 (and fluid-free cells, if any) can be sized and positioned to tailor the bladder sensitivity to the occupant weight, as described for example in the aforementioned U.S. Pat. No. 6,101,436. In addition to protecting bladder 30 from puncture damage, the upper and lower interface panels 32 and 34 serve to limit the system sensitivity to variations caused by manufacturing irregularities, temperature and aging; the upper interface panel 32 limits the system sensitivity to seat foam variations, while the lower interface panel 34 limits the system sensitivity to seat frame/suspension variations.

According to the present invention, the interface panels 32, 34 exhibit a variable or non-uniform rigidity so as to achieve the usual interface panel functionality without preventing the tailoring of bladder sensitivity through variation of the bladder geometry. In general, the more rigid regions of the interface panel 32, 34 limit system sensitivity to seat foam or suspension variations, and the less rigid regions of the interface panel 32, 34 permit differential movement and angulation of the more rigid regions for regional transfer of occupant weight to the bladder 30. The regional transfer of occupant weight to the bladder 30 allows regional variation of the bladder sensitivity to occupant weight through various bladder geometry design features such as flow-through or fluid-free cells.

The interface panel non-uniformity can be achieved in several different ways, four of which are depicted in FIGS. 2–5. The depicted embodiments are not intended to be exhaustive in nature, and various other embodiments will occur to those skilled in the art.

Figure 2:
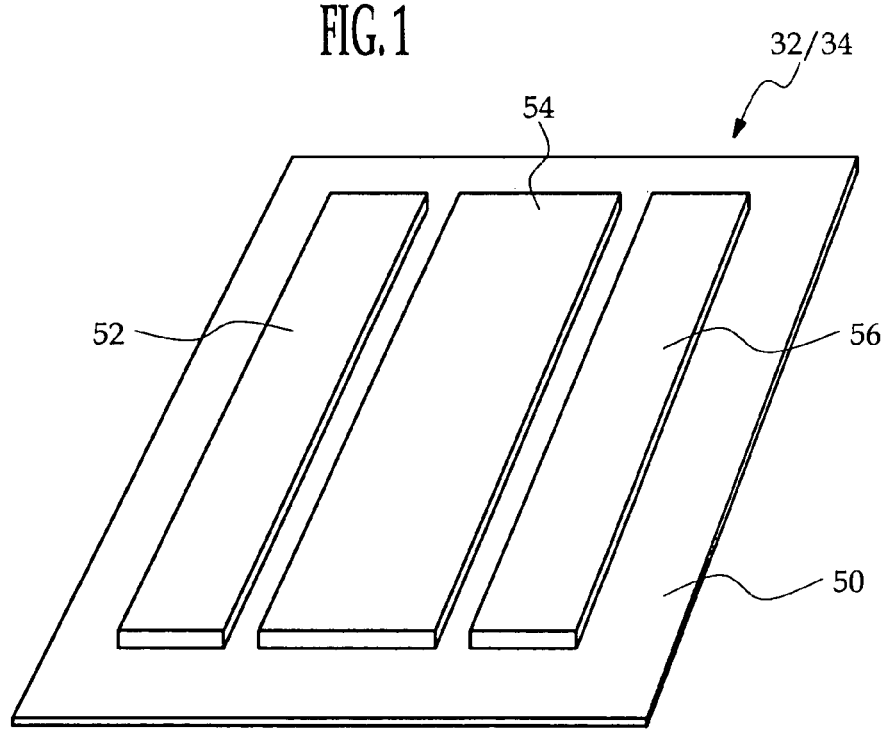
FIG. 2 is an isometric view of the upper interface panel of FIG. 1 according to a first embodiment of this invention.
Figure 3:
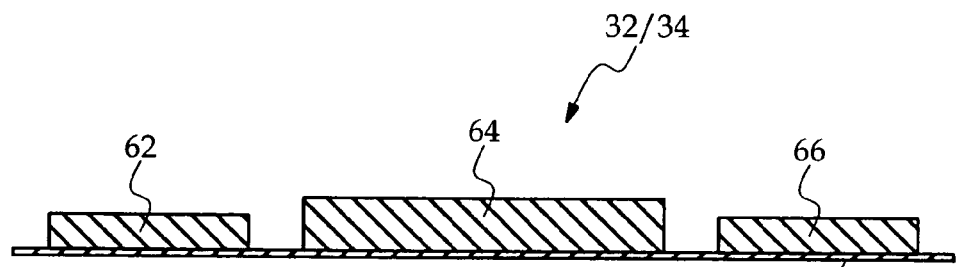
FIG. 3 is a cross-sectional view of the upper interface panel of FIG. 1 according to a second embodiment of this invention.

FIGS. 2 and 3 depict embodiments in which rigid plates 52, 54, 56; 62, 64, 66 are affixed to a flexible base sheet 50; 60. The base sheet 50, 60 merely serves as a carrier for the plates 52, 54, 56; 62, 64, 66; it exhibits insubstantial rigidity and may be a fabric material (such as Kevlar) or a very thin plastic material. The plates 52, 54, 56; 62, 64, 66 may be formed of plastic, and are sewn, glued or otherwise affixed to the base sheet 50, 60. The plates 52, 54, 56; 62, 64, 66 provide a controlled interface between the bladder 30 and the seat foam 16 or suspension 14 that limits system sensitivity to seat foam or suspension variations and protects the bladder 30 from puncture damage. The base sheet 50, 60 permits semi-independent movement and angulation of the plates 52, 54, 56; 62, 64, 66 for regional transfer of occupant weight to the bladder 30 so that different areas of the bladder 30 are independently activated by the occupant weight. In other words, the occupant weight is only regionally distributed, and the regional sensitivity to occupant weight can be tailored through the use of bladder geometry design features such as flow-through or fluid-free cells. In the embodiment of FIG. 2, the plates 52, 54, 56 have similar thickness, and therefore similar rigidity. In the embodiment of FIG. 3, the plates 62, 64, 66 have different thickness to provide different degrees of rigidity, as rigidity typically changes according to the cube of thickness. More rigid sections of the interface panel 32, 34 provide increased distribution of occupant weight over their area, and can be used to limit system sensitivity to known seat foam or suspension irregularities. Alternatively, different degrees of rigidity can be achieved by using plates 62, 64, 66 formed of different materials. In any event, the number and shape of the plates 52, 54, 56; 62, 64, 66 depicted in FIGS. 2 and 3 are merely exemplary, and may be customized for any given application.

Figure 4:
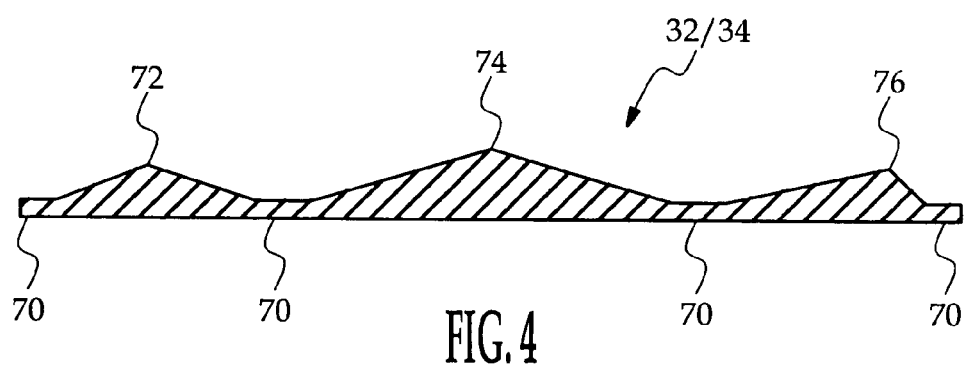
FIG. 4 is a cross-sectional view of the upper interface panel of FIG. 1 according to a third embodiment of this invention.

FIG. 4 depicts an embodiment in which the interface panel 32, 34 is formed as a unitary sheet of non-uniform thickness, by injection molding for example. The rigidity of the interface panel 32, 34 at any point is a function of its thickness as mentioned above. The relatively thick sections 72, 74, 76 serve the function of the plates 52, 54, 56; 62, 64, 66 of FIGS. 2–3, and the thin sections 70 serve the function of the base sheet 50, 60 of FIGS. 2–3. As with the embodiments of FIGS. 2–3, the number and shape of the relatively thick sections 72, 74, 76 are merely exemplary, and may be customized for any given application.

Figure 5:
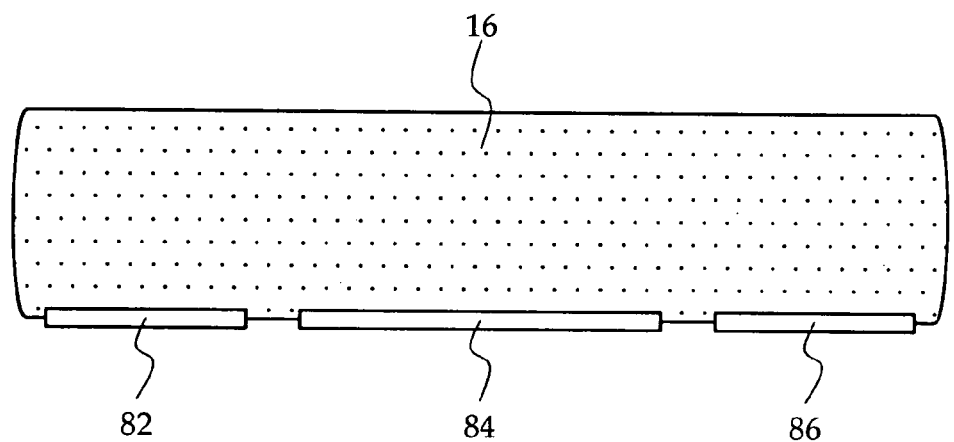
FIG. 5 is a cross-sectional view of the seat cushion and upper interface panel of FIG. 1 according to a fourth embodiment of this invention.

FIG. 5 depicts an embodiment of the upper interface panel 32 in which rigid plates 82, 84, 86 are integrated into the seat cushion foam 16 by insert-molding. In this case, the seat foam 16 serves as the carrier for the plates 82, 84, 86, reducing the number of parts in the bladder assembly 24. As with the embodiments of FIGS. 2–3, the number and shape of the plates 82, 84, 86 are merely exemplary, and may be customized for any given application.

In summary, the present invention provides an improved interface panel 32, 34 for installation between a fluid-filled seat bladder 30 and the seat foam and/or suspension. The interface panels 32, 34 exhibit a variable or non-uniform rigidity that protects the bladder and limits system sensitivity to seat foam or suspension irregularities, while permitting regional transfer of occupant weight to the bladder 30 so that the bladder sensitivity to regionally applied occupant weight can be tailored through variation of the bladder geometry. While the invention has been described in reference to the illustrated embodiments, it should be understood that various modifications in addition to those mentioned above will occur to persons skilled in the art, and that any of a number of devices may fall within the scope of this invention, which is defined by the appended claims.

What is claimed is:

1. Occupant weight estimation apparatus for a vehicle seat comprising:
    a fluid-filled elastomeric bladder disposed in said seat; and
    an interface panel of non-uniform rigidity disposed adjacent to said elastomeric bladder for transferring occupant weight to said bladder, said interface panel having multiple rigid regions joined by intervening flexible regions, where said intervening flexible regions deflect in response to occupant weight to permit differential movement and angulation of said rigid regions to achieve regional transfer of said occupant weight to said bladder.

2. Occupant weight estimation apparatus according to claim 1, where the interface panel comprises:
    a flexible base sheet; and
    multiple rigid plates affixed to said base sheet.

3. Occupant weight estimation apparatus according to claim 2, wherein said base sheet is a fabric material.

4. Occupant weight estimation apparatus according to claim 2, wherein said multiple rigid plates exhibit different degrees of rigidity.

5. Occupant weight estimation apparatus according to claim 4, wherein said multiple plates have different thicknesses.

6. Occupant weight estimation apparatus according to claim 1, where the interface panel comprises:
    a unitary sheet of non-uniform thickness.

7. Occupant weight estimation apparatus according to claim 1, where the interface panel comprises:
    multiple rigid plates affixed to a surface of said seat that engages said fluid-filled bladder.

8. Occupant weight estimation apparatus according to claim 7, wherein said multiple rigid plates are affixed to a foam cushion of said seat by insert molding.

* * * * *